US009851758B2

(12) United States Patent
Rowley

(10) Patent No.: US 9,851,758 B2
(45) Date of Patent: Dec. 26, 2017

(54) ASSEMBLY FOR STORING AND DEPLOYING FOR USE A HANDHELD DIGITAL DEVICE

(71) Applicant: Donald Lee Rowley, Hutchinson, KS (US)

(72) Inventor: Donald Lee Rowley, Hutchinson, KS (US)

( * ) Notice: Subject to any disclaimer, the term of this patent is extended or adjusted under 35 U.S.C. 154(b) by 0 days.

(21) Appl. No.: 15/268,167

(22) Filed: Sep. 16, 2016

(65) Prior Publication Data

US 2017/0003711 A1    Jan. 5, 2017

Related U.S. Application Data

(63) Continuation-in-part of application No. 14/994,348, filed on Jan. 13, 2016, now Pat. No. 9,538,833.

(51) Int. Cl.
| | |
|---|---|
| H04M 1/04 | (2006.01) |
| G06F 1/16 | (2006.01) |
| F16M 11/04 | (2006.01) |
| F16M 11/10 | (2006.01) |
| F16B 1/00 | (2006.01) |
| F16M 13/02 | (2006.01) |
| F16B 11/00 | (2006.01) |
| F16B 47/00 | (2006.01) |
| A45F 5/00 | (2006.01) |
| F16M 13/00 | (2006.01) |
| F16M 13/04 | (2006.01) |

(52) U.S. Cl.
CPC ............... *G06F 1/166* (2013.01); *A45F 5/00* (2013.01); *F16B 1/00* (2013.01); *F16B 11/006* (2013.01); *F16B 47/00* (2013.01); *F16M 11/041* (2013.01); *F16M 11/10* (2013.01); *F16M 13/00* (2013.01); *F16M 13/022* (2013.01); *F16M 13/04* (2013.01); *G06F 1/16* (2013.01); *G06F 1/1626* (2013.01); *A45F 2005/006* (2013.01); *A45F 2200/0516* (2013.01); *F16B 2001/0028* (2013.01); *F16B 2001/0035* (2013.01); *H04M 1/04* (2013.01)

(58) Field of Classification Search
CPC ....... A45F 2200/0516; A45C 2011/002; H04B 1/3877; H04M 1/04
See application file for complete search history.

(56) References Cited

U.S. PATENT DOCUMENTS

| | | |
|---|---|---|
| 6,550,108 B2 | 4/2003 | Pratl |
| 6,591,461 B2 | 7/2003 | Salentine et al. |
| D521,726 S | 5/2006 | Tarantino |
| D565,290 S | 4/2008 | Brandenburg et al. |
| 7,971,845 B2 | 7/2011 | Galant |
| D653,655 S | 2/2012 | Polito et al. |
| D663,725 S | 7/2012 | Polito et al. |
| D672,278 S | 12/2012 | Kalbach |
| D672,279 S | 12/2012 | Kalbach |
| D690,928 S | 10/2013 | Zhang |
| D705,767 S | 5/2014 | Yoon |
| D711,886 S | 8/2014 | Kerawala et al. |
| 8,794,560 B2 | 8/2014 | Salentine |
| D714,278 S | 9/2014 | Case et al. |

(Continued)

FOREIGN PATENT DOCUMENTS

| | | |
|---|---|---|
| WO | WO2015048006 A2 | 4/2015 |
| WO | WO2015095943 A1 | 7/2015 |

*Primary Examiner* — Bradley Duckworth
(74) *Attorney, Agent, or Firm* — Kenneth H. Jack; Davis & Jack, L.L.C.

(57) ABSTRACT

An assembly for storing and deploying for use a handheld digital device, the assembly incorporating a case adapted for nestingly receiving the handheld digital device; a pin and socket combination having upper and lower halves, the upper half being fixedly attached to or formed wholly with the case; a flexible lanyard; a pair of loops interconnecting the flexible lanyard and the pin; a base; a socket; and a hinge mount interconnecting the socket and the base; the pin and socket combination's socket being slotted for passage of the lanyard.

9 Claims, 9 Drawing Sheets

(56) References Cited

U.S. PATENT DOCUMENTS

| | | |
|---|---|---|
| D726,174 S | 4/2015 | Wahlin |
| 9,059,777 B2 | 6/2015 | Shattuck |
| 9,164,362 B2 | 10/2015 | Henry et al. |
| 9,179,762 B2 | 11/2015 | Paugh et al. |
| 2004/0029623 A1 | 2/2004 | Ellis et al. |
| 2004/0069823 A1 | 4/2004 | Condiff |
| 2005/0011982 A1 | 1/2005 | Salentine |
| 2006/0113345 A1 | 6/2006 | Zoullas et al. |
| 2006/0124676 A1 | 6/2006 | Mastrosimone |
| 2006/0272890 A1 | 12/2006 | Harmon et al. |
| 2007/0278265 A1 | 12/2007 | Contente |
| 2009/0120980 A1 | 5/2009 | Calayo |
| 2010/0206925 A1 | 8/2010 | Fielding, Jr. |
| 2012/0273541 A1 | 11/2012 | Zwach |
| 2013/0240578 A1 | 9/2013 | Yu |
| 2015/0014376 A1 | 1/2015 | Dannan |
| 2015/0045700 A1 | 2/2015 | Cavanagh et al. |
| 2015/0076183 A1 | 3/2015 | Palma |
| 2015/0091729 A1 | 4/2015 | Phillips |
| 2015/0148103 A1 | 5/2015 | Samsilova |
| 2015/0195392 A1 | 7/2015 | Nissenbaum |
| 2015/0201743 A1 | 7/2015 | Erickson-Davis |
| 2015/0237997 A1 | 8/2015 | Bruns |
| 2015/0305480 A1 | 10/2015 | Brousseau |
| 2015/0305518 A1 | 10/2015 | Galant |
| 2015/0309395 A1 | 10/2015 | Tomasewski |
| 2015/0311938 A1 | 10/2015 | Molnar |
| 2015/0334220 A1 | 11/2015 | Shannon |
| 2015/0341067 A1 | 11/2015 | Truchalska |
| 2015/0362828 A1 | 12/2015 | Patel |
| 2016/0007723 A1 | 1/2016 | Georges |
| 2016/0007735 A1 | 1/2016 | Gallup |
| 2016/0065702 A1 | 3/2016 | Carnevali |
| 2016/0120295 A1 | 5/2016 | Rowley |

ASSEMBLY FOR STORING AND DEPLOYING FOR USE A HANDHELD DIGITAL DEVICE

CONTINUATION IN PART STATUS OF APPLICATION

The foregoing patent application constitutes a Continuation in Part of U.S. patent application Ser. No. 14/994,348 filed Jan. 13, 2016, and entitled "Assembly for Storing and Deploying For Use a Handheld Digital Device". The applicant and inventor under said '348 application and the applicant and inventor of the instant application are the same person. The benefit of said Jan. 13, 2016, filing date is hereby claimed.

FIELD OF THE INVENTION

This invention relates to small handheld digital devices such as cell phones, smart phones, personal digital assistants, calculators, handheld game consoles, portable media players and the like. More particularly, this invention relates to assemblies for personally storing and deploying such devices for use.

BACKGROUND OF THE INVENTION

Handheld digital devices such as cell phones and smart phones are commonly stored within purses or pockets, and, during use, such devices are typically held and supported by a user's hands. Storage of such devices within pockets and purses is often inconvenient and causes difficulties in accessing the device. Also, hand support of such devices during use often undesirably occupies the user's hands which may be needed for performance of other tasks.

The instant inventive assembly for storing and deploying for use a handheld digital device solves or ameliorates problems and challenges discussed above by providing specialized case, fastener, and base components which allow for lanyard suspension of the device from a user's neck, and which allow base supported deployment from the user's neck or upon a surface for hands-free use.

BRIEF SUMMARY OF THE INVENTION

A first structural component of the instant inventive assembly comprises a case which is configured and adapted for nestingly receiving, holding, and protecting a handheld digital device such as a cell phone or smart phone. In a preferred embodiment, the invention's case component is composed of durable injection molded plastic.

A further structural component of the instant inventive assembly comprises a first pin and socket fastener, such fastener having upper and lower halves. As an alternative to such fastener, a pin configured lanyard fastener may be provided. Where a first pin and socket fastener is provided, the upper half of such fastener is preferably fixedly attached to or is wholly or integrally molded with the preferably plastic case component.

A further structural component of the instant inventive assembly comprises a flexible lanyard, preferably in the form of a neck loop or necklace. Preferably, the flexible lanyard comprises a woven synthetic fiber or cotton fiber strap or belt. Suitably, the flexible lanyard component may alternatively comprise leather strapping, a braided cord, or a length of chain.

A further structural component of the instant inventive assembly comprises means for interconnecting the flexible lanyard component with the lower half of the first pin and socket fastener or with the pin configured lanyard fastener, as the case may be. In a preferred embodiment, such interconnecting means comprise a loop or eye which is attached to or is integrally formed at either a lower end of the first pin and socket fastener or at a lower end of the pin configured lanyard fastener. In a preferred embodiment, such means' loop resides at the lower end of the pin. Alternatively, where the lower half of a provided first pin and socket fastener comprises a socket, such loop may reside at a lower end of such socket. The lanyard's interconnecting means preferably further comprise a second loop which is adapted for engaging the first loop, the second loop being fixedly attached to or formed wholly with a distal end of the lanyard. Alternatively, said interconnecting means may comprise an overmolded or adhesively bonded connection of the lanyard to the first pin and socket fastener or with the pin configured lanyard fastener, as the case may be. Other commonly known fasteners, such as screw fasteners and snap fasteners may be suitably substituted and utilized as lanyard interconnecting means.

In use of the instant inventive assembly, a user of the handheld digital device may suspend and personally store the device at the distal end of the lanyard while the lanyard hangs about the user's neck. During active use of the handheld digital device, and where a first pin and socket fastener is provided, the user may disengage the first pin and socket fastener for use of the device separate from the lanyard. Alternatively, the user may utilize the device in a handheld fashion while the device continues to be connected to the lanyard.

In order to additionally facilitate hands free use of the handheld digital device, the instant inventive assembly preferably further comprises support base and base supported socket fastener components. In the preferred embodiment, such socket fastener component is specially configured for nesting receipt of either the first pin and socket fastener's socket or an alternatively provided pin configured lanyard fastener. Such configuration advantageously allows the invention's case mounted components to additionally function as a pin component of the base supported pin and socket fastener. A base mounting means component, such as a hinge joint positioned and adapted for securing such socket over the base, is also preferably provided.

In use of the rendition of the inventive assembly which incorporates the above described base components, and upon provision of and fastening of a first pin and socket fastener, such fastener may be slidably received or fastened within the hollow bore of the base supported socket. In such assembly, the insertion of the provided first pin and socket fastener into the base supported socket allows the combination of such base socket and the interconnected first pin and socket to function as a second pin and socket fastener. The fastening of such second pin and socket fastener, or alternative first and only pin and socket as the case may be, allows the case and its nestingly received handheld digital device to be conveniently raised and displayed for use over the base.

Accordingly, objects of the instant invention include the provision of an assembly for storing and deploying for use a handheld digital device which incorporates structures as described above, and which arranges those structures in relation to each other in manners described above for the achievement of the beneficial functions described above.

Other and further objects, benefits, and advantages of the instant invention will become known to those skilled in the art upon review of the Detailed Description which follows, and upon review of the appended drawings.

DETAILED DESCRIPTIONS OF PREFERRED EMBODIMENTS

Figure 1:
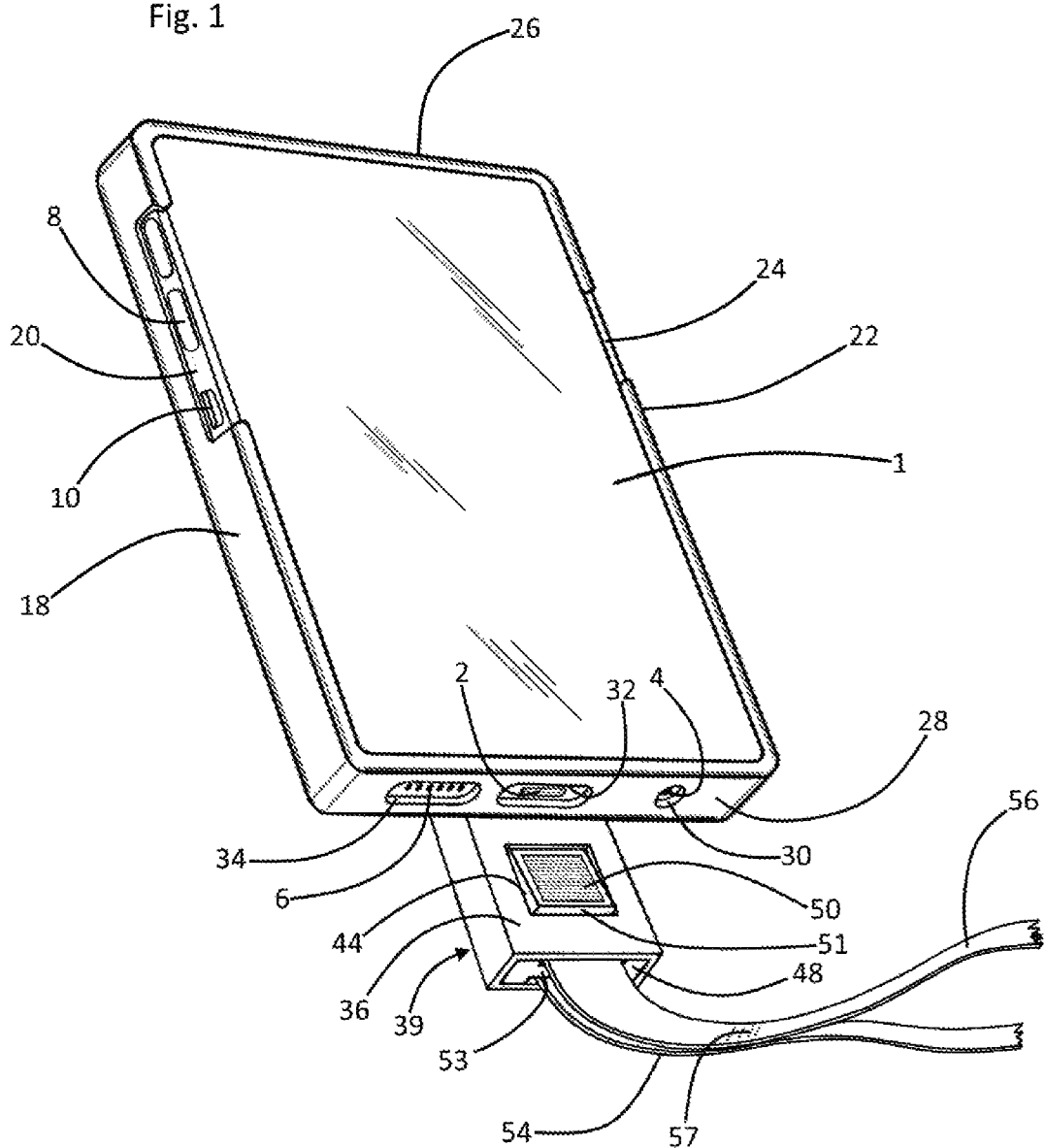
FIG. 1 is a perspective view of a preferred embodiment of the instant inventive assembly for storing and deploying for use a handheld digital device.
Figure 2:
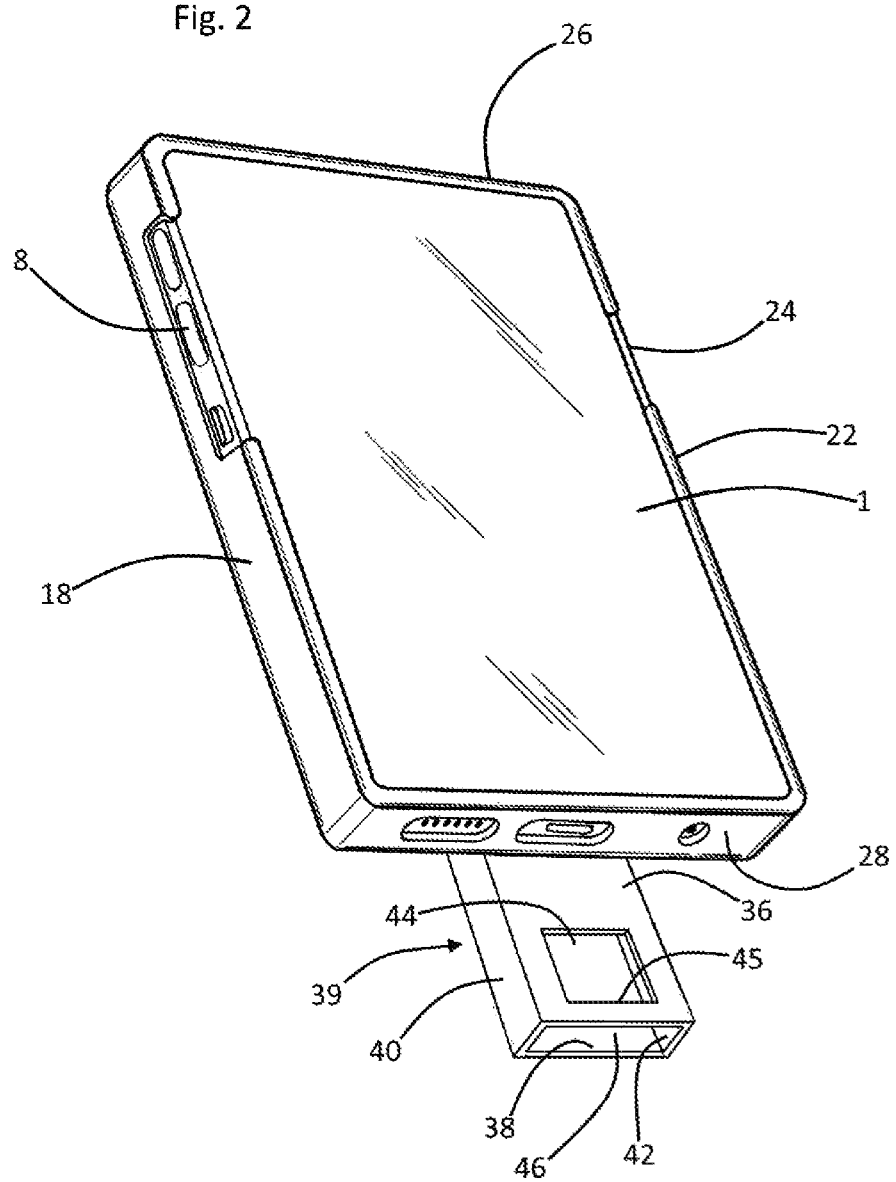
FIG. 2 redepicts the structure of FIG. 1, the view of FIG. 2 showing the removal of a lower half of a first pin and socket fastener component.
Figure 3:
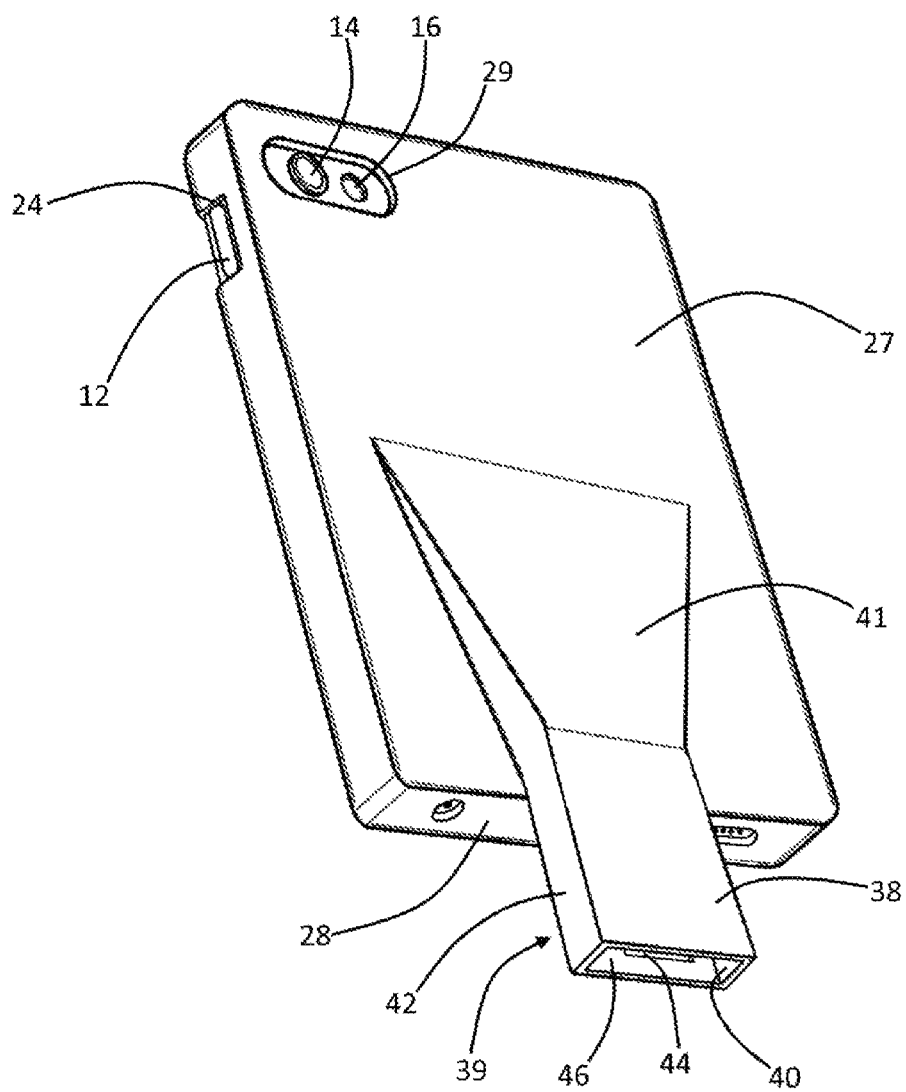
FIG. 3 is a reverse perspective view of the structure depicted in FIG. 2.

Referring now to the drawings, and in particular simultaneously to Drawing FIGS. 1-3, a conventional cell phone has a frontward or forward glass touch screen 1, volume switches 8, a mute switch 10, an on/off switch 12, a camera 14 and flash 16, a power cord socket 2, a headphone socket 4, and speaker sound ports 6, such cell phone being representative of various types of handheld digital devices which may be utilized with and served by the instant inventive assembly.

Corresponding with the cell phone, a case component of the instant inventive assembly has left and right side walls 18 and 22, an upper wall 26, a lower wall 28, and a back wall 27, the right wall 22 having an on/off switch slot 24, the left wall 18 having a volume switch slot 20, and the lower wall 28 having headphone, power cord, and speaker ports 30, 32, and 34. Consistently with the common positioning of a power cord socket at a cell phone's lower end, wall 28 comprises the case's lower end or lower wall. The instant invention's case component 18,22,26,27,28 securely and nestingly receives and protects the depicted handheld digital device component.

Figure 4:
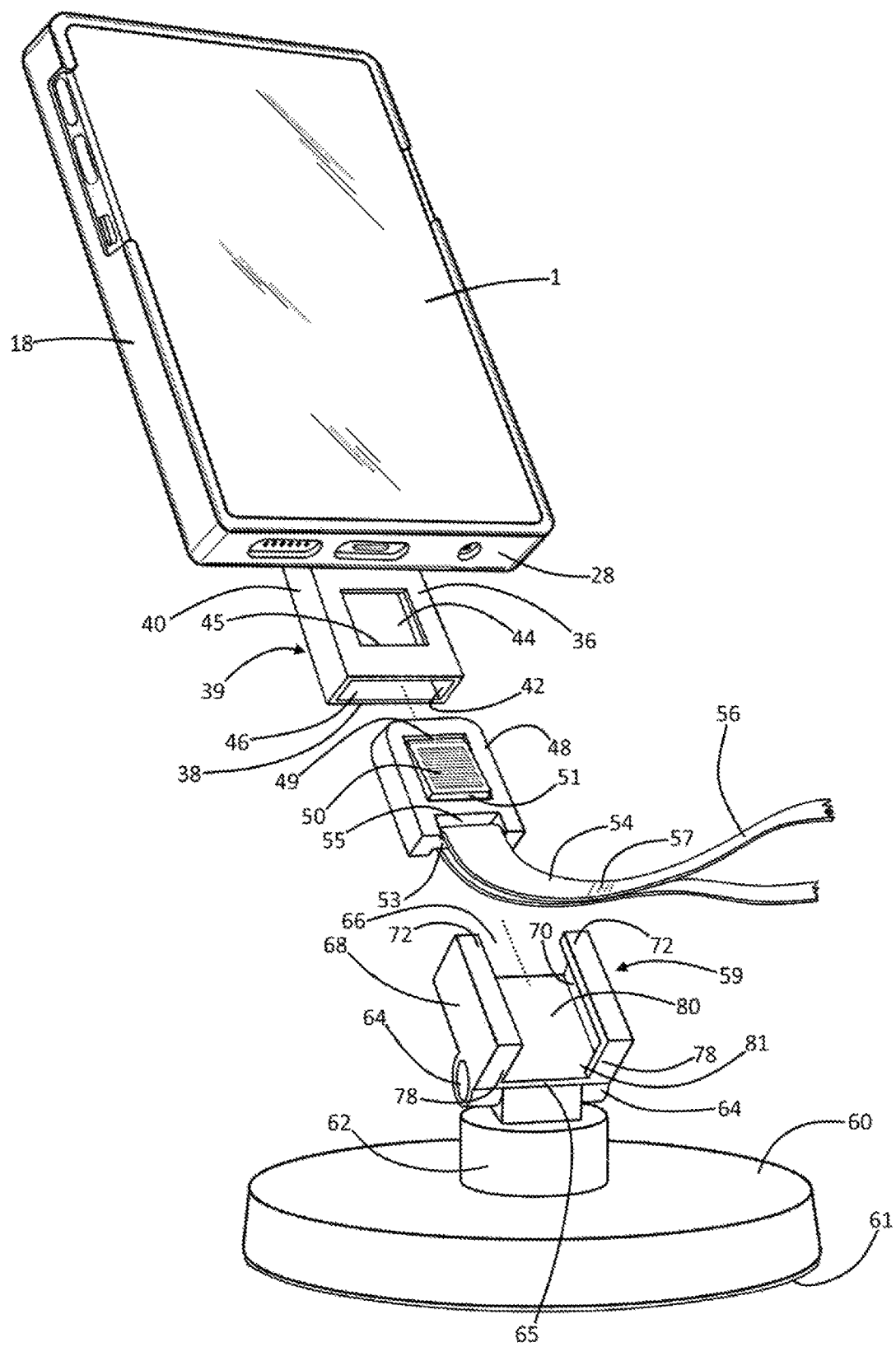
FIG. 4 redepicts the structure of FIG. 1, the view of FIG. 4 showing a disengagement of upper and lower halves of the first pin and socket fastener component, the view further showing base support structures.

A further structural component of the instant inventive assembly may suitably (and alternatively to a FIGS. 8 and 9 configuration) comprise a first pin and socket fastener, an example of which is depicted in a disassembled form in Drawing FIGS. 2, 3, and 4. Each of the invention's pin and socket fastener components is preferably configured to include upper and lower halves, and in example of FIGS. 2-4, the upper half of the depicted fastener comprises a socket (referred to generally by Reference Arrow 39) and the lower half comprises a pin 48. Socket 39 has a front wall 36, a back wall 38, a left wall 40, and a right wall 42, such walls defining a hollow bore having a lower pin receiving opening 46. As is particularly indicated in FIG. 3, the upper end of socket 39 forms a case junction 41 which is either fixedly attached to or formed wholly with the case's back or wall 27. Suitably, the case junction 41 may alternatively comprise a component which is adhesively bonded in a retrofitting fashion to an otherwise substantially conventional cell phone case.

Referring to FIG. 4, the pin component 48 of the invention's suitably provided first or case mounted pin and socket fastener is preferably closely fitted for slidable and nesting upward extension into and receipt within the lower opening 46 of such fastener's socket component 39. Suitably, the lower half of such first pin and socket fastener may be alternatively configured as an inverted socket component, while such fastener's upper half comprises a correspondingly inverted pin which is configured similarly with pin 48 (such inverted configuration not appearing within views). Accordingly, the exemplary first or case mounted pin and socket fastener depicted in the drawings is intended as being representative of such fastener's mechanical inverse.

A further structural component of the instant inventive assembly comprises a flexible lanyard which is represented by strap 56. In the preferred embodiment, the flexible lanyard 56 forms a neck suspension loop. The lanyard 56 is intended as being representative of other commonly known necklace or neck loop materials such as leather strapping, braided cords, woven fabric strapping, and chains.

A further structural component of the instant inventive assembly comprises means for interconnecting the flexible lanyard 56 and the lower half of a provided first or case mounted pin and socket fastener, such lower half comprising either a pin or a socket, as the case may be. In the example of Drawing FIG. 4, such interconnecting means comprise an interconnected pair of loops which attach the distal end of the lanyard 56 to the pin 48. As depicted, such loop pair may comprise a crossbar 53 and eye combination which is integrally formed at the lower end of the pin 48, the loop pair further comprising and a second loop 54 formed by stitching at a distal end of lanyard 56. Such loop pair 53,55,54,57 is intended as being representative of other commonly known means for attaching tethers, ties, and the like to pendant structures such as snap hooks, screw fasteners, pressure fitted fasteners, snap fasteners, and overmolded joints.

Figure 5:
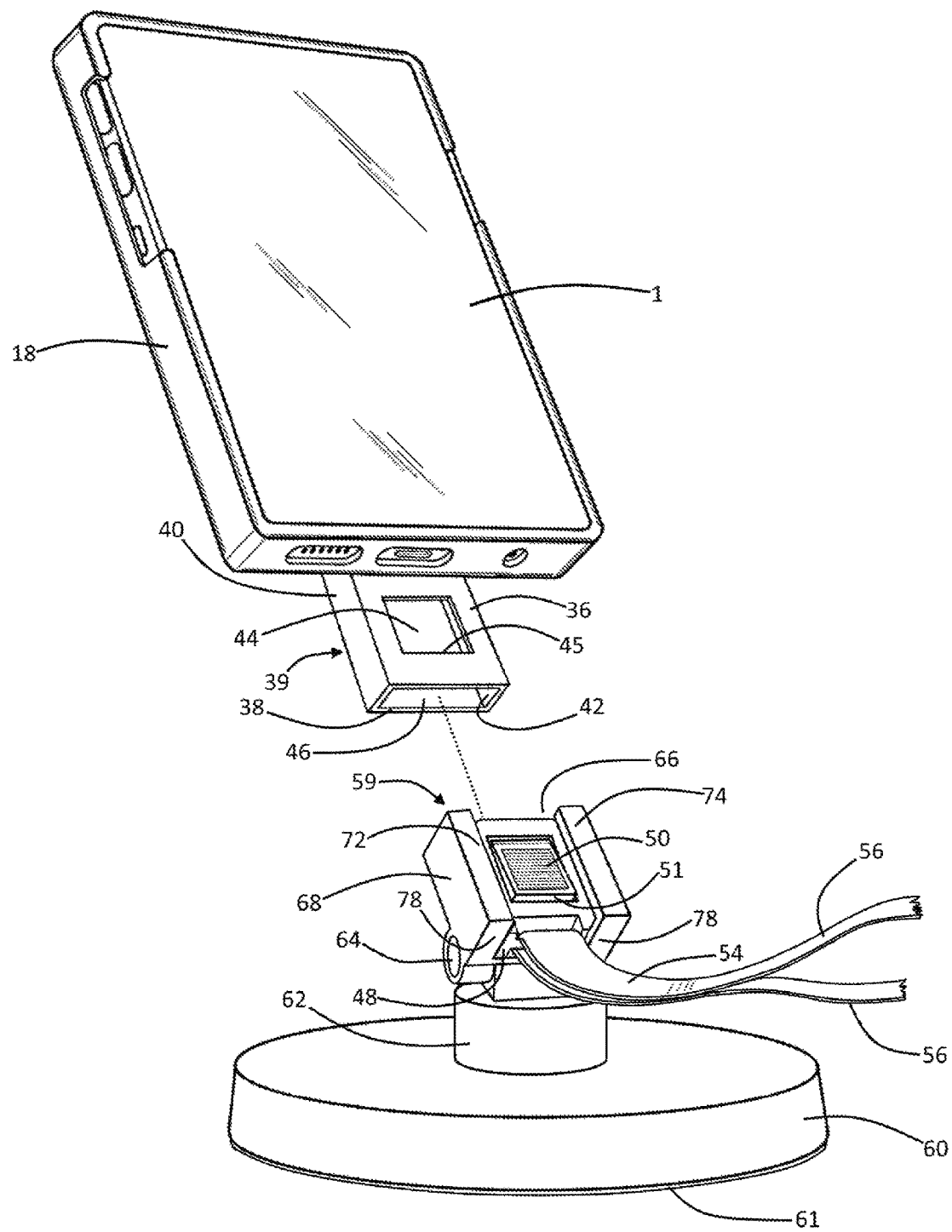
FIG. 5 presents an alternate configuration of the structures depicted in FIG. 4.
Figure 6:
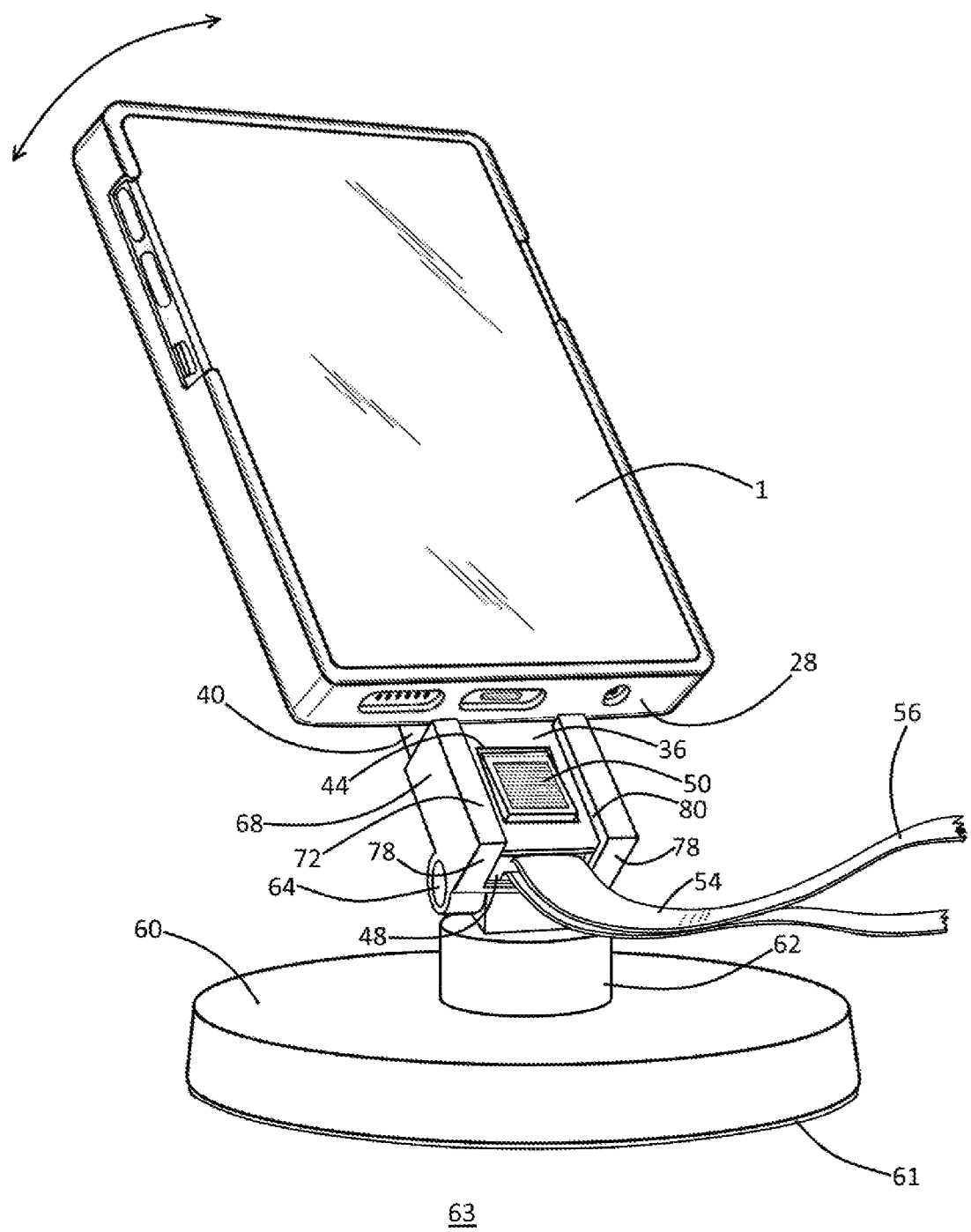
FIG. 6 presents a further alternate configuration of the structures depicted in FIG. 4.
Figure 7:
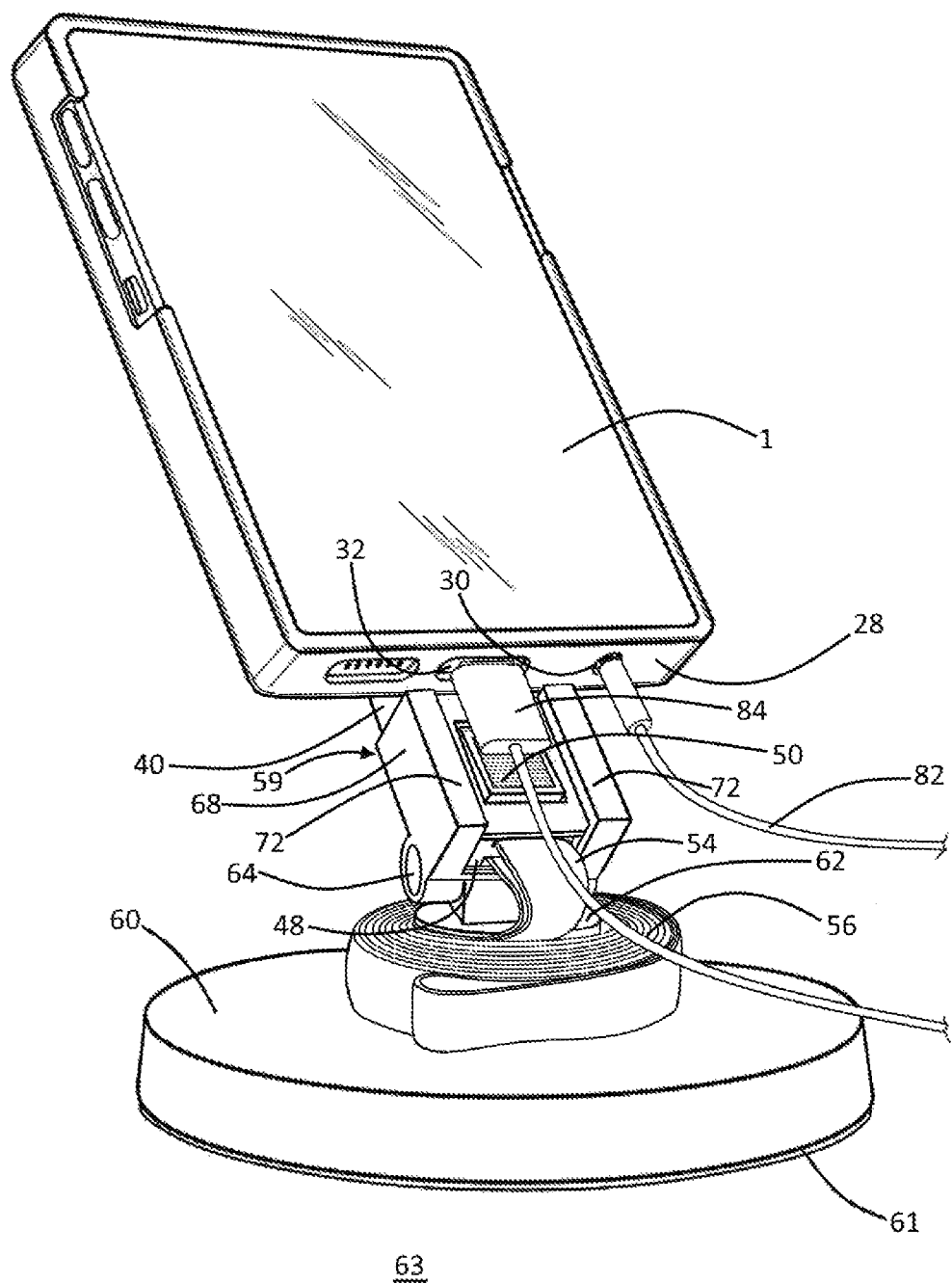
FIG. 7 redepicts the structures of FIG. 6, the view of FIG. 7 additionally showing power cord and headphone leads, and showing a lanyard in an alternative configuration.

Referring simultaneously to FIGS. 1-4, in order to securely and releasably hold the pin 48 in fastened engagement within bore 46 as indicated in FIG. 1, the provided first or case mounted pin and socket fastener preferably operatively incorporates a spring and hook ledge combination. Referring to the example of FIG. 4, an exemplary spring hook component of such combination comprises a finger press tab 50 which is flexibly connected to pin 48 via a living hinge 49. The lower end of the tab 50 presents a hook edge 51 which, upon assembly of the fastener as indicated in FIG. 1, overlies and releasably engages a hook ledge 45 formed at the lower end of a latch release port 44 opening socket 39. Where the upper and lower halves of the first pin and socket fastener are inverted, as discussed above, the spring hook and hook ledge combination's hook ledge may alternatively reside at an upper edge of a similarly configured latch release port. The finger press tab 50 is preferably centrally positioned upon the front face of pin 48 so that, upon an assembly of components as indicated in FIGS. 5-7 (such assembly being further discussed below) both the tab 50 and the latch release port 44 are upwardly and forwardly presented for a user's fingertip access and actuation within a lanyard passage slot 80. Notwithstanding, the latching member represented by tab 50 may suitably be alternatively configured as paired or left and right side press hook arms (not depicted within views) which reside at left and right sides of pin 48. Where the pin component alternatively comprises such paired hook arms, edges of left and right latch release ports (also not depicted within views) may be engaged by such arms, such ports alternatively opening the socket 39 at side walls 40 and 42.

In use of the instant inventive assembly, and referring simultaneously to FIGS. 1-4, a user may initially fasten a provided first or case mounted pin and socket fastener by snapping pin 48 into place within socket opening 46 as indicated in FIG. 1. Such fastening action moves the pin 48 from its FIG. 4 position to its FIG. 1 position. Thereafter, the user may extend loop 56 over his or her head, and may allow the cell phone and case to hang and distally suspend from the user's neck. During active cell phone use, the user may allow the cell phone and case to continue to be attached to lanyard 56. Alternatively, the user may conveniently detach the cell phone and case by depressing tab 50 and by slidably extracting the pin 48 from the socket 46.

Referring to FIGS. 4-7, the instant inventive assembly preferably further comprises a support base 60 and another pin and socket fastener, such other pin and socket fastener constituting a second pin and socket fastener where the above described first or case mounted pin and socket fastener is provided. In the example of Drawing FIG. 4, a socket portion of such second pin and socket fastener is referred to generally by Reference Arrow 59, such socket comprising a back wall 65, a front wall 72, a left wall 68, and a right wall 70. Such walls preferably form and define a hollow bore having an upper opening 66 which is fitted for sliding and nesting receipt of such first pin and socket fastener's socket 39. Accordingly, the socket portion 39 of such provided first pin and socket fastener may advantageously dually function as a lanyard fastener and as a pin half of such second or base mounted pin and socket fastener.

Means for interconnecting and fixedly positioning the socket half 59 of such second or base mounted pin and socket fastener over the base 60 are provided, such means suitably comprising a lanyard spooling column 62 having a hinge joint 64 at its upper end. The depicted hinge 64 and column 62 combination is intended as being representative of other base connectors such as rigid flanges, rigid stays, bonded connections, and whole or integral formations of the socket 59 with the base 60.

Referring simultaneously to FIGS. 1, 4, and 6, in order to facilitate a downward insertion of the pin half 48 of a provided first pin and socket fastener into the socket portion 59 of a corresponding second pin and socket fastener without interference with the attached lanyard 56, a lanyard passage slot 80 preferably opens the socket 59 at front wall 72, such slot 80 preferably further opening such socket at a base extension 81 within lower wall 78.

In use of the embodiment of the inventive assembly depicted in FIG. 6, the base 60 may rest upon a surface such as a desktop or vehicle dashboard 63. Preferably, the hinge 64 offers frictional resistance to pivoting movement in order to allow the user to selectively angularly move the cell phone and case frontwardly and backwardly as indicated by the FIG. 6's curved arrow. Such selective pivoting movement may conveniently align the cell phone and case orthogonally with respect to the user's sight line. During such base supported use, referring further to FIG. 7, the lanyard 56 may be compactly stored via spiral winding about the base's lanyard spooling column 62.

In the event that the user wishes to transition from the base supported mode of cell phone use depicted in FIGS. 6 and 7 to a neck lanyard suspension usage mode, as depicted in FIG. 1, the user may simply grasp the cell phone and case. Thereafter, the user may upwardly draw the attached socket 39 and snap fastened pin 48 out of the base socket 59. During such upward drawing action, the spooled lanyard 56 advantageously automatically un-spools and dispenses from the spooling column 62. Thereafter, the user may conveniently loop the lanyard 56 about his or her neck in the manner described above. A reversal of such steps conveniently re-configures the assembly for desktop or vehicle dashboard use as depicted in FIGS. 6 and 7.

The centrally positioned and upwardly facing exposures of tab 50 and latch release aperture 44 within the lanyard passage slot 80 allows the user to further alternatively depress tab 50 and upwardly remove the cell phone and case while the first pin and socket fastener's pin 48 and attached lanyard 56 remain in place as depicted in FIG. 5 or 7. Following such separated use of the cell phone and case, the socket 39 may be downwardly snapped into place upon base 60 by sliding the four peripheral walls of such socket between the outer walls of pin 48 and the four peripheral walls of socket 59.

Referring simultaneously to FIGS. 3 and 7, a provided first pin and socket fastener 39,48 may be advantageously positioned at a rearwardly stepped orientation with respect to the lower wall 28 of the case. Referring in particular to FIG. 7, such rearwardly stepped configuration advantageously exposes the lower wall 28 over socket 59 and allows a power cord 84 and/or a headphone 82 to be conveniently attached during base support.

A pad 61 applied or attached to the undersurface of base 60 constitutes means for securing the base 60 upon the surface 63. As examples, the pad 61 is intended as being representative of a hook pad half of a flexible hook and loop pad fastener, a loop pad half of a flexible hook and loop pad fastener, an adhesive pad, a permanent magnet, a paramagnetic plate, a weight plate, a suction cup, or an elastomeric friction enhancing pad.

Figure 8:
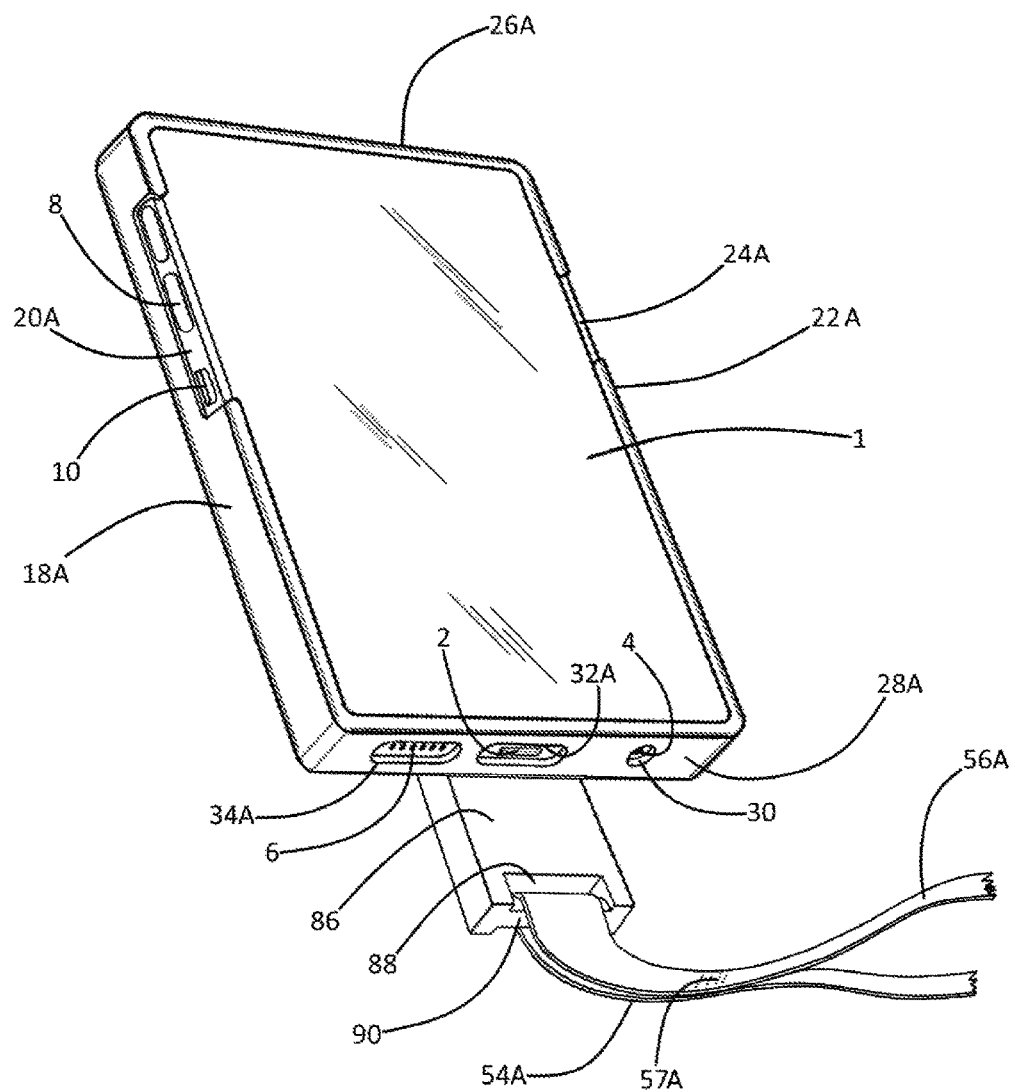
FIG. 8 presents an alternative configuration of the structure of FIG. 1.
Figure 9:
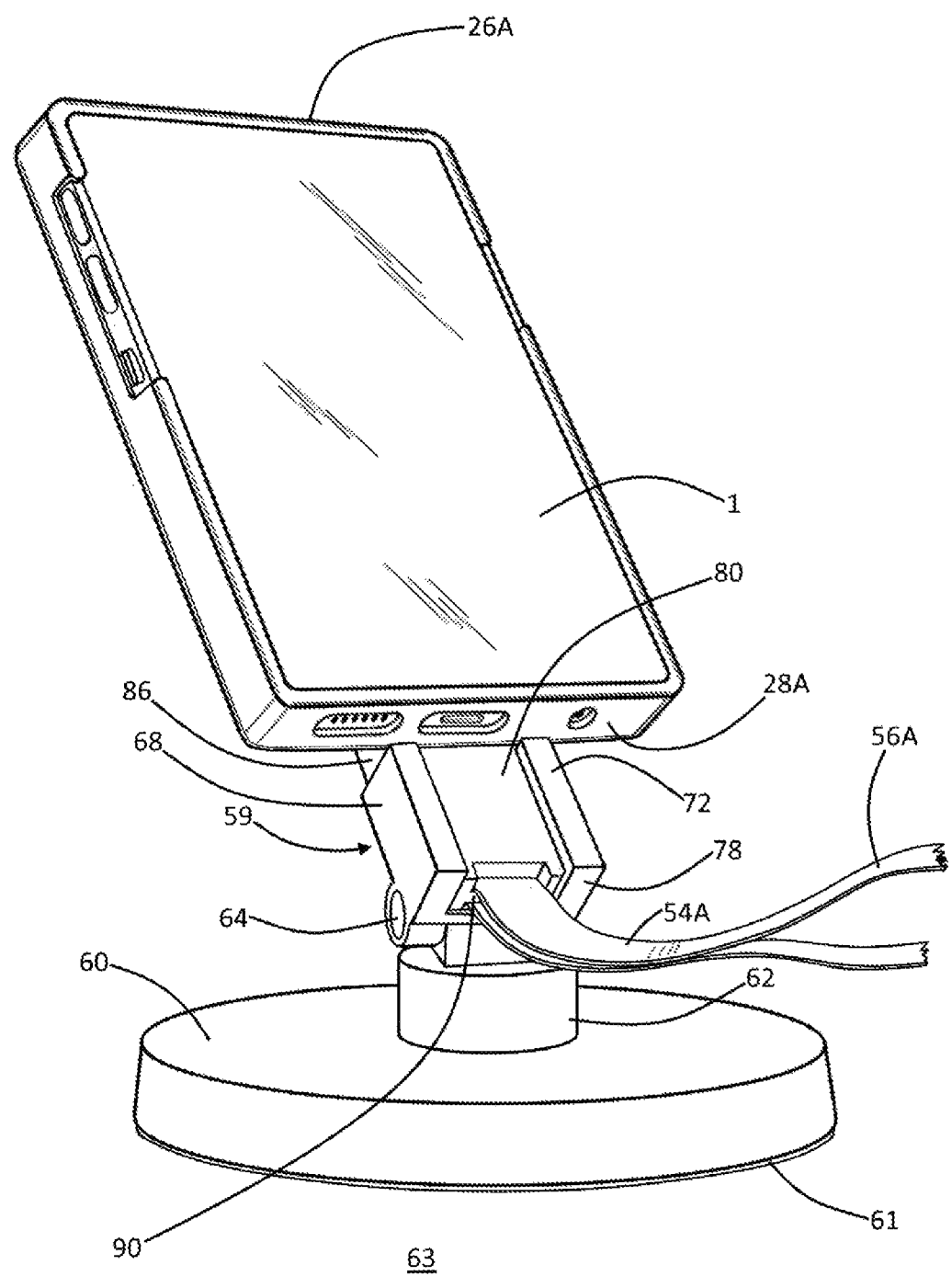
FIG. 9 presents an alternative configuration of the structure of FIG. 6.

Referring to FIGS. 8 and 9, each structure identified by a reference numeral having a suffix "A" is substantially identical to similarly numbered structures appearing in FIGS. 1-7. In the FIGS. 8 and 9 structural alternative, the pin 48 and socket 39 combination of FIG. 4 is omitted, and such combination is replaced with a rigid pin 86. The lower end of such rigid pin 86 is preferably specially configured to present a lanyard attachment loop 88,90. Such loop 88,90 is intended as being representative of other suitably substituted lanyard fasteners such integrally molded connections and adhesively bonded connections.

The alternative lanyard attaching pin 86,88,90 engages and is supported by the base's socket 59 in a manner substantially identical to such socket's support of the alternative first pin and socket joint 39,48 as in FIGS. 6 and 7. In the FIGS. 8 and 9 structural alternative, the clearance slot 80 of the base socket 59 continues to facilitate passage without interference of the lanyard 56.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope at least commensurate with the appended claims.

The invention hereby claimed is:

1. An assembly for storing and deploying for use a handheld digital device, the handheld digital device having upper and lower ends and having front and back sides, the assembly comprising:
   (a) a handheld digital device case having a back surface;
   (b) a pin and socket combination, said combination having an upper pin half and a lower socket half, said upper pin half being fixedly attached to or formed wholly with the handheld digital device case back surface;

(c) a flexible lanyard;

(d) a fastener interconnecting the flexible lanyard and the pin and socket combination's upper pin half; and (e) a base, the pin and socket combination's lower socket half being fixedly attached to the base.

2. The assembly of claim 1 wherein the pin has a lower end configured as a lanyard engaging loop.

3. The assembly of claim 2 wherein the lanyard comprises a distal end loop, and wherein the fastener comprises a combination of the pin's lanyard engaging loop and the lanyard's distal end loop.

4. An assembly for storing and deploying for use a handheld digital device, the handheld digital device having upper and lower ends and having front and back sides, the assembly comprising:

(a) a case having a lower end, the case being adapted for nestingly receiving the handheld digital device;

(b) a pin and socket combination, said combination's pin comprising a lanyard engaging loop, said combination having upper and lower halves wherein the upper half is fixedly attached to or formed wholly with the case;

(c) a flexible lanyard comprising a distal end loop;

(d) a fastener, said fastener comprising a combination of the pin's lanyard engaging loop and the lanyard's distal end loop, wherein said fastener interconnects the flexible lanyard and the pin and socket combination's upper half; and (e) a base, the pin and socket combination's lower socket half being fixedly attached to the base; wherein the pin and socket combination's socket opens upwardly for pin receipt, and further comprising a lanyard passage slot, said slot further opening said socket.

5. The assembly of claim 4 wherein the lanyard passage slot is positioned at a front side of the socket.

6. The assembly of claim 5 wherein the socket is fixedly attached to the base by a hinge, the hinge being adapted for facilitating pivoting movements of the case and the handheld digital device backwardly and frontwardly with respect to the base.

7. The assembly of claim 6 further comprising means for securing the base upon a surface.

8. The assembly of claim 7 wherein the means for securing the base upon the surface comprise a member selected from the group consisting of hook pad halves of flexible hook and loop pad fasteners, loop pad halves of flexible hook and loop pad fasteners, adhesive pads, permanent magnets, para-magnetic plates, weight plates, suction cups, and elastic friction pads.

9. The assembly of claim 6 wherein the fixed attachment of the socket to the base further comprises a lanyard spooling column, said column spanning between the hinge and the base.

* * * * *